United States Patent [19]  
Sato et al.

[11] Patent Number: 4,552,907  
[45] Date of Patent: Nov. 12, 1985

[54] EPOXY RESIN COMPOSITION

[75] Inventors: Shigeyuki Sato, Toyota; Mitsumasa Matsushita, Nagoya, both of Japan

[73] Assignee: Kabushiki Kaisha Toyota Chuo Kenkyusho, Aichi, Japan

[21] Appl. No.: 635,012

[22] Filed: Jul. 27, 1984

[30] Foreign Application Priority Data

| Jul. 29, 1983 | [JP] | Japan | 58-139777 |
| Aug. 11, 1983 | [JP] | Japan | 58-147127 |
| Oct. 14, 1983 | [JP] | Japan | 58-193065 |
| Oct. 25, 1983 | [JP] | Japan | 58-199729 |
| Nov. 8, 1983 | [JP] | Japan | 58-209593 |
| Nov. 24, 1983 | [JP] | Japan | 58-221230 |
| Jun. 26, 1984 | [JP] | Japan | 59-131536 |
| Jun. 26, 1984 | [JP] | Japan | 59-131537 |
| Jun. 28, 1984 | [JP] | Japan | 59-133877 |

[51] Int. Cl.$^4$ .................... C08G 59/02; C08K 5/09  
[52] U.S. Cl. .................... 523/455; 174/25 C; 174/110 E; 523/173; 523/456  
[58] Field of Search .............. 174/25 C, 110 E; 523/173, 455, 456

[56] References Cited

U.S. PATENT DOCUMENTS

| 3,843,568 | 10/1974 | Woodland et al. | 523/173 |
| 3,864,431 | 2/1975 | Reid | 523/173 |
| 3,872,040 | 3/1975 | Mollohan et al. | 525/934 |
| 3,878,146 | 4/1975 | Charlton | 523/173 |
| 4,026,862 | 5/1977 | Smith et al. | 174/110 E |
| 4,256,591 | 3/1981 | Yamamoto et al. | 252/12 |
| 4,282,122 | 8/1981 | Edelman et al. | 523/173 |
| 4,459,277 | 7/1984 | Kosti | 424/7.1 |

FOREIGN PATENT DOCUMENTS 2094819 9/1982 United Kingdom .

Primary Examiner—Ronald W. Griffin  
Attorney, Agent, or Firm—Blum, Kaplan, Friedman, Silberman & Beran

[57] ABSTRACT

Epoxy resin compositions including an epoxy resin, a hardener and an additive containing a rust preventing film forming component are provided. The additive is lanolin and/or a lanolin derivative. Optionally, the composition also includes a secondary additive selected from organosilicon compounds, organoaluminum compounds, organotitantium compounds, organotin compounds, liquid rubber having functional groups at both ends of the molecule, petroleum lubricating oils or Japan wax. These epoxy resin compositions, when used as encapsulating materials, prevent moisture and impurities from invading the surface of the device.

53 Claims, No Drawings

EPOXY RESIN COMPOSITION

BACKGROUND OF THE INVENTION

This invention relates to epoxy resin compositions, and more particularly to epoxy resin compositions suitable for use as encapsulating materials for semiconductor devices and the like.

Generally, epoxy resins are cured using hardeners, such as amines, acid anhydrides, phenol resins, etc. to yield products having excellent electrical, mechanical and thermal properties. These properties make the epoxy resins suitable for use as encapsulating materials for protecting semiconductor devices and other electronic components from the environment or mechanical shocks. Plastic encapsulation using epoxy resins also presents productivity and economic advantages compared to encapsulating with ceramics or metals. For these reasons plastic encapsulation is used more frequently.

Recent advances in the art have resulted in semiconductor devices being more highly integrated. Accordingly, such highly integrated devices are being used in a greater variety of situations than heretofore. As the uses of such devices have increased, the need for reliability and maintenance of the electrical performance at high temperatures and high humidity has also increased. However, conventional epoxy resins possess fundamental problems under such conditions as will be described below. Accordingly, it has been difficult to provide an epoxy resin encapsulated device having the desired electrical characteristics at high temperature and high humidity.

Devices encapsulated with conventional epoxy resin compositions have low moisture resistance and corrosion resistance. This is attributable to the fact that the resin and the electrical device are in direct contact with each other and that the plastic encapsulation is not hermetic. Improvements have been extremely difficult. The epoxy resins absorb moisture and are permeable to moisture due to polar groups remaining in the cured products. Additionally, epoxy resins contain ionic impurities, such as chlorine derived from the epichlorohydrin used as a starting material, sodium derived from sodium hydroxide used for dechlorination, etc.

The ionic impurities are present in high concentration in the raw materials. Thus, interaction between the impurities and the moisture due to absorption or permeation results in a reduction in electrical performance. There is a reduction in the insulating properties of the plastic encapsulating the electrical parts which results in an increase in leakage current and the like. This may even cause corrosion of aluminum wiring and electrodes used in the devices which result in failure of the device.

At high temperatures the ionic impurities and other polar substances present in the resins become more mobile with an increase in activity due to thermal motion. When an electric field is generated in a portion of a device that ionic impurities become more active at the interface of the resin and the element. This lowers the electrical characteristics locally. If water is present corrosion rapidly proceeds and exerts an adverse effect.

In order to overcome these problems and maintain the electrical characteristics of a resin encapsulated device at high temperature and high humidity, various proposals have been made. For example, one such suggestion is to lower the reduction in the volume resistivity of the epoxy resin composition by the addition of an organosilicon compound. Such organosilicon compounds include, alkylarylsilsesquioxane silicon compounds having the chemical formula A described in Japanese Patent Application, Laid Open No. 81333/1981, as follows:

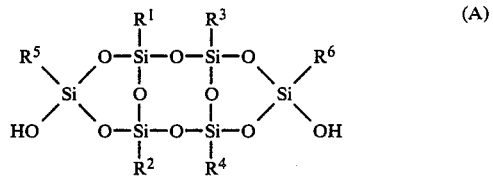

wherein $R^1$ to $R^6$, inclusive, are the same or different and each represents alkyl, aryl, alkenyl or aralkyl. Other organosilicon compounds suggested as additives include organosiloxane polymers having the general formula B, described in Japanese Patent Publication Nos. 29720/1978 and 17536/1983, as follows:

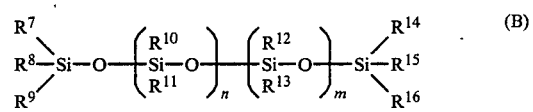

wherein $R^7$–$R^{16}$, inclusive, are the same or different and each represents alkyl, aryl, alkenyl, aralkyl, hydrogen or hydroxy, and n and m are independently 0 or an integer of 1 or more.

The electrical insulating property of resins including these additives are good at high temperatures and high humidity. However, the moisture resistance of resins including these organosilicon compound additives is not fully satisfactory. This is believed due to the ionic impurities in the epoxy resins.

There are other proposals for improving the moldability when encapsulating with the plastics and for increasing the compatibility between the resin and the elements of the device by adding an organotin compound. Such organotin compounds include di-n-butyltin dimalate, dioctyltin dilaurate, etc. as described in Japanese Patent Publication No. 33470/1978 and Japanese Patent Application Laid Open No. 126842/1982. However, even when including the tin additives, the moisture resistance and the adverse effect due to the ionic impurities in the epoxy resin require further improvement.

Recently, with the advances in high integration, semiconductor devices have become larger in size and the aluminum wiring included therein has become more minute. Additionally, the packages including the devices are becoming thinner and are often presented in articles having flat configurations. Under these circumstances, there is a need for an encapsulating plastic having high moisture resistance coupled with reduced stresses. Further, since high integration increases heat generation, extremely strenuous requirements which do not permit reduction in heat resistance have been made.

In order to overcome these additional problems, various proposals are suggested in the art. One example includes forming a low stress epoxy resin composition, wherein internal stress due to contraction caused by curing when encapsulating an electrical device is reduced by adding a so-called telechelic polymer. One such example is a liquid rubber having a structure wherein functional groups are present at both ends of the molecule. These are described in Japanese Patent Application Laid Open Nos. 180626/1982 and 131223/1982. While these additives reduce stress in the epoxy resin compositions, the moisture resistance is poor. This causes an adverse influence due to the presence of the ionic impurities as is the case with the organosilicon compound additives discussed above.

Finally, it has also been proposed to increase moisture resistance by reducing the ionic impurities present in the epoxy resin, or increasing the adhesion between the electrical elements and the resin. However, it remains difficult to remove the ionic impurities from the resin completely. This presents a problem of mold release and adhesion between the electrical part and the resin increases.

Accordingly, it is desirable to provide an epoxy resin composition particularly well suited for use as an encapsulating material for electrical elements, such as semiconductor devices which overcomes the problems associated with prior art compositions.

SUMMARY OF THE INVENTION

Generally speaking, in accordance with the invention, an improved epoxy resin composition particularly well suited for encapsulation of electrical devices is provided. The resin composition includes an epoxy resin, a hardener and an additive of lanolin or a lanolin derivative. The composition may further include an additional additive, such as an organosilicon compound, an organoaluminum compound, an organotitanium compound, an organotin compound, a liquid rubber having a structure with functional groups at both ends of the molecule, a petroleum lubricating oil or Japan wax. These epoxy resin compositions have excellent moisture resistance, rust preventing properties and provide good adhesion to electrical elements.

Accordingly, it is an object of the invention to provide an improved epoxy resin composition.

Another object of the invention is to provide an improved epoxy resin composition having improved moisture resistance and rust preventing properties.

A further object of the invention is to provide an epoxy resin composition containing a component for forming a rust preventing film for preventing the invasion of moisture or ionic impurities through the resin.

Still another object of the invention is to provide an improved epoxy resin composition particularly well suited for use as an encapsulating material for electrical component, for excluding rust and preventing rust from forming on the surfaces of electrical elements.

Still other objects and advantages of the invention will in part be obvious and will in part be apparent from the specification.

The invention accordingly comprises a composition of matter possessing the characteristics, properties, and the relation of components which will be exemplilfied in the composition hereinafter described, and the scope of the invention will be indicated in the claims.

DESCRIPTION OF THE PREFERRED EMBODIMENTS

The epoxy resin compositions in accordance with the invention includes an epoxy resin component, a hardening agent and a lanolin additive which is lanolin or a lanolin derivative. The composition may also include various secondary additives, such as an organosilicon compound, an organoaluminum compound, an organotitanium compound, an organotin compound, a liquid rubber having functional groups at both ends of the molecule, a petroleum lubricating oil or Japan wax.

The epoxy resin for use with the epoxy resin composition of the invention is not limited and may be a conventional one. Examples thereof include glycidyl ether epoxy resins, phenol novolak epoxy resins, cresol novolak epoxy resins, alicyclic epoxy resins, glycidyl ester epoxy resins, linear aliphatic epoxy resins, halogenated epoxy resins and the like. These epoxy resins may be used either alone, or as a mixture of two or more. The preferred epoxy resins are the phenol novolak epoxy resins and the cresol novolak epoxy resins in view of the electrical characteristics, heat resistance, etc. The epoxy resins are subjected to curing by the use of hardeners to be described below.

The hardening agent suitable for use with the composition in accordance with the invention is also not limited. Examples of hardeners include acid anhydrides, such as phthalic anhydride, succinic anhydride, methylnadic anhydride, and the like, aromatic amines, such as methaphenylenediamine, diaminodiphenyl sulfone, aromatic amine adducts, and the like, aliphatic or alicyclic amines, such as polymethylenediamine, menthanediamine, and the like, prepolymers of synthetic resins, such as phenol resins, cresol resins, and the like. These hardeners may be used either alone, or as a mixture of two or more. The preferred hardeners based on the improved electrical characteristics are the prepolymers of synthetic resins, such as the phenol resins, etc.

The epoxy resin and the hardener are mixed in amounts so that the chemical equivalent ratio of the number of functional groups in the hardener to the number of epoxy groups in the epoxy resin is in the range of between about 0.5 to 1.5. This ratio is varied depending on the shelf life and curing characteristics, such as speed and the thermal and mechanical properties desired after curing. Preferably, the chemical equivalent ratio is in the range of 0.8 to 1.2 wherein improved curing characteristics may be obtained.

A curing accelerator may also be used in order to promote the speed of curing with the hardener. The particular curing accelerator used is not significant. Examples of curing accelerators include imidazoles, such as imidazole, 2-methylimidazole, 2-phenylimidazole, 2,4-dimethylimidazole, etc., amines, such as triethylamine, diethylaminopropylamine, N-aminoethylpiperadine, etc., complexes of triethylamine and the like and boron trifuloride ($BF_3$), and the like. These curing accelerators may be used either alone, or as a mixture of two or more. When a curing accelerator is used, the accelerator may be present in the range of about 0.05 to 5 parts by weight by 100 parts by weight of the epoxy resin.

The lanolin additive included in the epoxy resin composition in accordance with the invention includes at least one of lanolin and a lanolin derivative. The additional secondary additive is a member selected from organometallic compound or a hydrocarbon selected from the group consisting of an organosilicon compound, an organoaluminum compound, an organotitanium compound, an organotin compound, a liquid rubber having a molecular structure with functional groups at both ends of the molecule, a petroleum lubricating oil and Japan wax.

The lanolin additive is a wool fat which is a mixture of esters of fatty acids and monohydric higher alcohols. The particular type of lanolin utilized in the compositions in accordance with the invention is not limited. However, purified lanolin which has been deodorized, dehydrated, and decolorized is preferable in order to form a rust preventing film without impurities. Examples of the lanolin derivatives suitable for use, include lanolin fatty acids which may be obtained by removing alcohol from lanolin, such lanolin fatty acid derivatives include lanolin fatty acid metal salts, such as barium lanolate, magnesium lanolate, zinc lanolate, aluminum lanolate, calcium lanolate, sodium lanolate, etc., and the like. In the compositions in accordance with the invention, either one or both of the lanolin and a lanolin derivative additive may be included.

The lanolin and/or lanolin derivative additive is preferably included in the composition in an amount between about 0.1-10 parts by weight per 100 parts by weight of epoxy resin. If the additive concentration is less than 0.1 part, moisture resistance and rust prevention are not readily achieved. If the concentration exceeds 10 parts by weight, the increase in results is small due to the addition and there is a possibility that other characteristics, such as adhesion and heat resistance are impaired.

The organosilicon compound suitable as a secondary additive is an alkylarylsilsesquioxane silicon compound having the general formula A, shown below, or an organosiloxane polymer of the general formula B, shown below as follows:

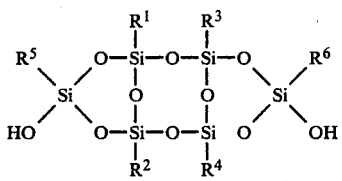
[A]

wherein $R^1$–$R^6$ are the same or different and each represents alkyl, aryl, alkenyl or aralkyl, and

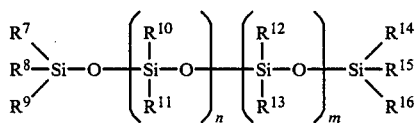
[B]

wherein $R^7$–$R^{16}$ are the same or different and each represents alkyl, aryl, alkenyl, aralkyl, hydrogen or hydroxy, and n and m are independently 0 or an integer of 1 or more.

The alkylarylsilsequioxane silicone compound may be methylphenylpolysilsesquioxane having a hydroxyl group equivalent of 400 and a molecular weight of 1,600 wherein $R^1$–$R^6$ are methyl groups and phenyl groups. In the compositions in accordance with the invention, if such a secondary additive is used, one or more than one of the alkylarylsilsequioxane silicone compounds may be used.

The organosiloxane polymers suitable for use in the compositions in accordance with the invention include polydimethylsiloxane, polymethylphenylsiloxane, polydiphenylsiloxane, polymethylhydrogensiloxane, polymethylpentylsiloxane, polymethylnonanesiloxane, copolymers thereof and the like. It is not necessary that the organosiloxane polymer be of a single molecular weight, but may be of a wide range of molecular weights varying from low to high. When such an organosiloxane polymer is utilized in a composition in accordance with the invention, more than one polymer may be used.

When an organosilicon secondary additive is included in the epoxy resin compositions in accordance with the invention, it may be included in amounts from about 0.1-5 parts by weight per 100 parts by weight of the epoxy resin. If less than 0.1 parts by weight are present, the tendency to form the rust preventing film with enhanced electrical insulating properties is not entirely satisfactory. On the other hand, if the concentration exceeds about 5 parts by weight, the effects are improved by the addition, but there is an increase in cost.

The liquid rubber additive having functional groups at both ends of the molecule is a polymer forming a three-dimensional cross-linked structure, which is a so-called telechelic polymer. Examples of such liquid rubbers include, polybutadiene, acrylonitrile-butadiene copolymers, styrene-butadiene copolymers, polysulfides and the like. These rubbers have functional groups, such as carboxyl groups, epoxy groups, amino groups and hydroxyl groups at both ends of the polymer molecules. The functional groups may be the same or different at each end. When such a rubber is included in the composition in accordance with the invention, more than one such rubber may be used.

The rubber compound may be mixed with the epoxy resin when preparing the composition. However, it is preferable to subject the liquid rubber to a prereaction with the epoxy resin in order to increase its compatibility. Triphenylphosphine may be used as a catalyst for the prereaction.

When the liquid rubber is added to the compositions in accordance with the invention, preferably between about 0.5-20 parts by weight per 100 parts by weight of the epoxy resin are included. If less than 0.5 part by weight are included, reduction in stress is not always accomplished. On the other hand, if the concentration of the liquid rubber exceeds 20 parts by weight, there is a possibility of phase separation, a reduction in glass transition temperature and a reduction in mechanical strength.

The petroleum lubricating oil is a complex mixture of hydrocarbons, primarily including high molecular weight hydrocarbons. The type of petroleum lubricating oil suitable for use as a secondary additive in the composition in accordance with the invention is not restricted. Examples of such oils include spindle oil, refrigeration machine oil, engine oil, cylinder oil, gear oil, aircraft lubricating oil, liquid paraffin, and the like. When the lubricating oil is used, more than one such oil may be included.

When a petroleum lubricating oil is included in the composition, it is preferably included between about 0.1-10 parts by weight per 100 parts by weight of the epoxy resin. If the oil concentration is less than 0.1 part by weight, moisture resistance and rust prevention is not always attained. On the other hand, if the oil concentration exceeds 10 parts by weight, a further increase in properties may be achieved, but there is a possibility that other desireable characteristics, such as adhesion and the like are reduced. Preferably, the lubricating oil is present in an amount between about 1-6 parts by weight in order to achieve improved moisture resistance and rust preventing properties.

Japan wax is a fat obtained by extracting the mesocarp of the fruit of *Rhus succedanea L., Anacardiaceae.*

It is formed of glycerides and primarily includes palmitic acid and also contains dibasic acid glyderides. Japan wax which may be included in the compositions in accordance with the invention may be used regardless of origin, purification method, degree of purification, acid value, saponification value, iodine value or melting point.

When Japan wax is added to the composition, preferably between about 0.1–10 parts by weight per 100 parts by weight of the epoxy resin are included. If the concentration is less than 0.1 part by weight, moisture resistance and rust prevention is not easily attained. On the other hand, if the concentration exceeds 10 parts by weight, improvements in characteristics may be exhibited, but there is a possibility that other properties, such as adhesion and the like are reduced. Preferably, the Japan wax is present in the range of about 1–6 parts by weight in order to obtain the best moisture resistance and rust preventing properties.

The organoaluminum compound suitable for use as a secondary additive is not limited, however, preferably a stable compound having good water repellency is utilized. Such organoaluminum compounds are, for example, trialkoxyaluminum compounds, aluminum chelate compounds, aluminum coupling agents, and the like. Specific examples of organoaluminum compounds, include, aluminum isopropylate, aluminum butylate, aluminum sec-butylate, aluminum tert-butylate, aluminum diisopropylate sec-butylate, aluminum isopropylate di-sec-butylate, aluminum octylate, aluminum laurate, aluminum stearate, aluminum oxide isopropylate, aluminum oxide octylate, aluminum oxide stearate, aluminum tris-ethylacetoacetate, aluminum isopropoxyethylacetoacetate, aluminum di-butoxyacetoacetate, aluminum di-butoxyethylacetate, and the like. When an organoaluminum compound is included in the composition, more than one may be used.

The organoaluminum compound is added in a concentration between about 0.01–5 parts by weight per 100 parts by weight of the epoxy resin. When less than 0.01 part by weight is used, the moisture resistance and rust prevention is not readily achieved. If the concentration exceeds 5 parts by weight, the properties improve, but the other characteristics, such as moldability and heat resistance are impaired.

The organotitanium compound which may be included as a secondary additive is not limited, but a stable compound having good water repellency is preferred. Suitable titanium compounds include tetraalkoxytitanium compounds, titanium acylate compounds, titanium chelate compounds, titanium coupling agents. etc. Specific examples of suitable titanium compounds are tetraisopropyl titanate, tetrabutyl titanate, terta-2-ethylhexyl titanate, tetrastearyl titanate, isopropyl tristearyl titanate, tributyl stearyl titanate, butyl titanate dimer, polytriporopyl titanate, polybutyl titanate, polytributyl stearyl titanate, titanium acetylacetonate, titanium ethylacetoacetate, titanium octylene glycolate, dihydroxy-bis(lactate) titanium, tetraoctylene glycol titanium, dipropoxytitanium bis(lactate), polytitanium acetylacetonate, polyhydroxytitanium stearate, isopropyl tridodecylbenzenesulfonyl titanate, isopropyl tris(-dioctylpyrophosphate)titanate, tetraisopropyl bis(dioctylphosphite)titanate, tetraoctyl bis(ditridecylphosphite)titanate, tetra(2,2-diallyloxymethyl-1-butyl)bis(ditridecy phosphite)titanate, bis(dioctylpyrophosphate)oxyacetotitanate, bis(dioctylpyrophosphate)ethylene titanate, etc. When a titanium compound is used, more than one may be included.

The organotitanium compound is included in the composition in an amount from about 0.01–5 parts by weight per 100 parts by weight of the epoxy resin. If less than 0.01 part by weight is included the moisture resistance and rust prevention is not fully achieved. If the concentration exceeds 5 parts by weight, the improvements are maintained, but other characteristics, such as moldability and heat resistance may be impaired.

The organotin compound which may be included as a secondary additive is not limited. However, the organotin compound is preferably a stable compound having good water repellency. It is possible to use organotin stabilizers which are common additives for polyvinyl chloride resins. Such organotin compounds include alkyltin compounds, alkyltin mercaptide compounds, alkyltin sulfide compounds, alkyltin unsubstituted monocarboxylate compounds, alkyltin maleate compounds, alkyltin fumarate compounds, alkyltin substituted carboxylate compounds, alkyl stannate compounds, alkyltin-inorganic acid salt compounds, bis(alkyltin) oxide compounds, alkylhydroxy(or alkoxy)tin compounds, aryltin compounds, phenolate tin compounds, tin aromatic carboxylate compounds, tin side-chain carboxylate compounds, tin aliphatic carboxylate compounds, etc. Specific examples of the organotin compounds include tetrabutyltin, dibutyltin dilauryl mercaptide, butyltin tris-dodecyl mercaptide, dimethyltin sulfide, monooctyltin sulfide, tributyltin laurate, tributyltin oleate, dibutyltine dilaurate, dibutyltin distearate, dibutyltin laurate maleate, dioctyltin laurate maleate, tributyltin acetate, trimethyltin maleate, tributyltin maleate, tributyltin gluconate, dibutyltin oxide, bistributyltin oxide, tetraphenyltin, tributyltin butyl phenolate, tributyltin benzoate, triphenyltin benzoate, triphenyltin terephthalate, tributyltin cinnamate, etc. When used, more than one organotin compound may be included in the composition.

The amount of the organotin compound included in the composition is preferably between about 0.01–5 parts by weight per 100 parts by weight of the epoxy resin. If less than 0.01 part by weight is included, the moisture resistance and rust prevention is not fully achieved. If the concentration exceeds 5 parts by weight, the improvement is noted, but there is a possibility that other characteristics, such as moldability, is reduced.

Each of the above described additives other than the liquid rubber forms a rust preventing film when the epoxy resin composition is used as a plastic encapsulating material for electrical components. A portion of the additive does not react with the epoxy resin or hardener and exudes from the resin after the component is encapsulated. The additive which migrates to the surface of the encapsulated electrical device forms a rust preventing film. The rust preventing film which forms has excellent moisture resistance and prevents ionic impurities from penetrating into the device and protects it. The organosilicon compound additive also minimizes a reduction in electrical insulation properties at high temperatures in addition to forming the rust preventing film.

The liquid rubber which has functional groups at both ends of the polymer molecule tends to reduce internal stress and thermal stresses due to contraction on curing. These are reduced due to intergrating the functional groups into the molecular structure of the epoxy resin and increasing its compatibility, thereby lowering the stresses of the resin composition.

The resin compositions in accordance with the invention prevent moisture and ionic impurities from penetrating the surface of the resin. When used as an encapsulating material and migrating to the encapsulated device the resin compositions provide excellent moisture resistance and rust preventing properties. By excluding atmospheric moisture and ionic impurities from reaching the surface of the electrical components, the compositions prevent a decrease in the insulation properties of the electrical elements. Additionally, this prevents a reduction in electrical performance and prevents an increase in leakage current and the like. In sum, the compositions in accordance with the invention are particularly well suited for encapsulation of electrical devices and extend the reliability of the encapsulated electrical elements.

Since the additives included in the compositions in accordance with the invention function as rust preventing film-forming components, it is unnecessary to deposit a rust preventing film on the surface of an electrical component. Thus, additional processing steps commonly associated with fabrication of electrical devices may be eliminated. Additionally, the desireable properties of the epoxy resin compositions in accordance with the invention are particularly well suited for use in paint and adhesive compositions.

The epoxy resin compositions in accordance with the invention include primarily (a) an epoxy resin, (b) a hardening agent and (c) a lanolin and/or lanolin derivative additive described above. The dimensional stability, thermal characteristics and workability may be further improved by adding an additional inorganic filler to the composition. Examples of the inorganic fillers which may be included, include zirconia, alumina, talc, clay, magnesia, molten silica, crystalline silica, calcium silicate, calcium carbonate, barium sulfate, glass fiber, milled fiber and the like. Of these additional inorganic fillers, molten silica and crystalline silica are among the most preferred.

Additionally, the epoxy resin compositions in accordance with the invention may contain additional agents, for examples: release agents, such as natural wax, synthetic wax, straight-chain fatty acid metal salts, acid amides, esters and mixtures thereof; flame retardants, such as chlorinated paraffin, brominated bisphenol A epoxy resins, brominated phenol novolak epoxy resins, bromotoluene, bromotoluene, hexabromobenzene, antimony trioxide, etc.; a surface treating agent, such as a silane coupling agent, a titanium coupling agent and the like and colorants, such as carbon black, etc. when required by the application.

Generally, the epoxy resin compositions in accordance with the invention may be prepared by completely mixing the above-described raw materials in a mixer, such as a Henschel mixer, melting and kneading the components in a kneading machine, such as a heat roll or a kneader, then cooling and grinding the composition. The following Examples are set forth to illustrate the compositions in accordance with the invention and their method of preparation. The Examples are set forth as illustrative and are not set forth in a limiting sense.

EXAMPLE 1

An orthocresol novolak epoxy resin, either alone or with a bisphenol A epoxy resin was utilized to prepare five samples having the epoxy resin composition as indicated in Table 1. Purified lanolin or calcium lanolate was added as indicated in Table 1 as the lanolin or metal lanolate additive. The epoxy resin and lanolin additives were mixed in the mixing ratios as set forth in Table 1 (wherein all numerals are set forth in parts by weight). The epoxy resin and lanolin components of each sample were mixed with 50 parts by weight of phenol novolak resin as a hardening agent, 3 parts by weight of 2-phenolimidazole as a curing accelerator, 350 parts by weight of molten silica as an inorganic filler, 2 parts by weight of epoxy silane as a surface treating agent and 2 parts by weight of carnauba wax as a release agent. The components were mixed and each sample was melted and kneaded in a heat roll at a temperature of 80°–90° C. for five minutes. Samples were permitted to cooled immediately to harden and were ground. Each ground product was molded into tablets to prepare five different epoxy resin compositions all in accordance with the invention and designated Sample Nos. 1–5.

For purposes of comparison, an epoxy resin composition designated Sample No. $C_1$ in Table 1 was prepared using the same components, amounts and conditions as for Samples Nos. 1–5, except that the purified lanolin and calcium lanolate were omitted.

The six epoxy resin compositions of Samples Nos. 1–5 and Sample No. $C_1$ were used to encapsulate a sample electrical element including aluminum wiring and electrodes in a transfer molding machine at 175° C. for three minutes which was then cured by further heating at 165° C. for eight hours. In order to test the performance of the encapsulated samples, they were subjected to a pressure cooker test. This test included applying a bias of 12 V in saturated steam at 121° C. and a pressure of 2 atom. The average life of each sample was measured and the moisture resistance of the encapsulation was evaluated. The results of the test are set forth in Table 2. The average life referred to in the Table is the time in hours (based on an average of several sample tablets) until the aluminum wiring or electrodes corroded and electrical conductivity was lost.

The results set forth in Table 2 show that when an epoxy resin compositions in accordance with the invention is used the useful life of the electrical element increased markedly. Even at the high temperature and high humidity of the test, the average life of the encapsulated element was extended markedly for the composition in accordance with the invention as compared to the conventional composition. Thus, the epoxy resin compositions in accordance with the invention have demonstrated usefulness as encapsulating material for electrical components.

TABLE 1

| | Sample No. | | | | | |
| | Invention | | | | | Comparison |
| | 1 | 2 | 3 | 4 | 5 | $C_1$ |
|---|---|---|---|---|---|---|
| Orthocresol Novolak Epoxy Resin | 100 | 100 | 100 | 100 | 75 | 100 |
| Bisphenol A Epoxy Resin | — | — | — | — | 25 | — |
| Purified Lanolin | 1 | 2 | — | — | — | — |
| Calcium Lanolate | — | — | 1 | 2 | 1 | — |

TABLE 2

| | Sample | | | | | |
|---|---|---|---|---|---|---|
| | Invention | | | | | Comparison |
| | 1 | 2 | 3 | 4 | 5 | $C_1$ |
| Average Life (hr) | 200 | 245 | 200 | 350 | 350 | 90 |

EXAMPLE 2

Five additional epoxy resin compositions in accordance with the invention designated Sample Nos. 6–10 in Table 3 were prepared. These samples were prepared using the same components, amounts and conditions as described in Example 1, except that 100 parts by weight of the orthocresol novolak epoxy resin was mixed with methylphenylpolysilsequioxane (Toray Silicone SH 6018) as an alkylarylsilsesquioxane silicone compound of the epoxy resin. Purified lanolin as the lanolin additive or calcium lanolate as a metal lanolate additive was included in the mixing ratios set forth in Table 3. The amounts set forth are all in parts by weight.

For purposes of comparison, epoxy resin compositions designated Sample Nos. $C_2$–$C_4$ were prepared using the same components, amounts and conditions as in Sample Nos. 6–10, except that the methylphenylpolysilsequioxane and/or lanolin additive was not included.

The eight epoxy resin compositions identified in Table 3 were used to encapsulate sample electrical elements as described in Example 1 which was then subjected to the pressure cooker test. The results are set forth in Table 4.

As shown in Table 4, when electrical elements encapsulated with an epoxy resin composition prepared in accordance with the invention are used under high temperature and humidity, the average life is markedly extended compared to the conventional compositions excluding the additives in accordance with the invention.

TABLE 3

| | Sample | | | | | | | |
|---|---|---|---|---|---|---|---|---|
| | Invention | | | | | Comparsion | | |
| | 6 | 7 | 8 | 9 | 10 | $C_2$ | $C_3$ | $C_4$ |
| Purified Lanolin | 1 | 2 | — | — | — | — | — | 1 |
| Calcium Lanolate | — | — | 1 | 2 | 1 | — | — | — |
| Silicone Compound | 1 | 1 | 1 | 1 | 2 | — | 1 | — |

TABLE 4

| | Sample | | | | | | | |
|---|---|---|---|---|---|---|---|---|
| | Invention | | | | | Comparison | | |
| | 6 | 7 | 8 | 9 | 10 | $C_2$ | $C_3$ | $C_4$ |
| Average Life (hr) | 300 | 370 | 370 | 420 | 400 | 90 | 95 | 200 |

EXAMPLE 3

Six additional epoxy resin compositions in accordance with the invention designated Sample Nos. 11–16 as described in Table 5 were prepared. These compositions were prepared using the same components, amounts and conditions as described in Example 1, except that 100 parts by weight of the orthocresol novolak epoxy resin was mixed with a lanolin additive and the various organosilocane polymers identified in Table 5. The amounts set forth are all in parts by weight.

For purposes of comparison, six additional epoxy resin compositions designated Sample Nos. $C_5$–$C_{10}$ were prepared. These comparative compositions were prepared using the same components, amounts and conditions as above, except that one of the lanolin additives or the organosiloxane polymer additive was eliminated or both were eliminated as set forth in the Table.

The twelve expoxy resin composition in this Example were used to encapsulate an electrical element and subject it to the pressure cooker test as described in Example 1. The results are set forth in Table 6. The results show that when the epoxy resin compositions are used under conditions of high temperature and high humidity, the average life of the electrical element is markedly improved, compared to conventional compositions which do not include the additives in accordance with the invention.

EXAMPLE 4

100 parts by weight of an orthocresol novolak epoxy resin and 10 parts by weight of an acrylonitrile-butadiene copolymer having a molecular weight of 3,000 with carboxyl groups at both ends of the molecule were prereacted in the presence of triphenylphophine to prepare a rubber-modified epoxy resin. This resin, either alone or together with additional orthocresol novolak epoxy resin was mixed with a lanolin additive as set forth in Table 7 to provide Sample Nos. 17–21. All parts set forth therein are by weight. The same hardening agent, curing accelerator, inorganic filler, surface treating agent and release agent as described in Example 1 were added to the composition in the same amounts as in Example 1 and the compositions were mixed. The procedures in Example 1 were then followed to prepare these five different epoxy resin compositions in accordance with the invention.

For purposes of comparison, Sample Nos. $C_{11}$–$C_{13}$ as identified in Table 7 were prepared using the same components, amounts and conditions set forth above, except that the rubber-modified epoxy resin was not included. Thus, only the orthocresol novolak epoxy resin was used as the epoxy resin component. The lanolin additive was included as indicated. Sample No. $C_{14}$ was prepared in the same manner and the rubber-modified epoxy resin was used alone without the novolak resin or lanolin additives.

These nine epoxy resin compositions were encapsulated onto electrical elements and subjected to the pressure cooker test as described in Example 1. The results are set forth in Table 8.

The samples were subjected to an additional low stress test. In this tes, the samples were subjected to repetitive heating and cooling. The test included 200 cycles wherein each sample was maintained at a temperature of −50° C. and 150° C., alternately for thirty minutes. Each sample was examined for formation of cracks and openings in the bonding wire. The results set forth in Table 9 set forth the number of failures out of ten pieces tested.

As is clearly demonstrated in Table 8, when the epoxy resin compositions in accordance with the invention are used at high temperature and high humidity, the average life of the encapsulated component increases markedly compared with comparative compositions. It can also be seen from Table 9 that when the compositions of the invention are used the number of failures is substantially reduced as the resin compositions in accordance with the invention have excellent moisture resistance and low stress properties. This makes these compositions particularly well suited as an encapsulating plastic for encapsulating electrical components. Sample No. 17, while only having an average life of 280 hours which is lower than any other sample in accordance with the invention, had no failures in the stress test. Thus, even though the moisture resistance is not high as other compositions in accordance with the invention, Sample No. 17 has excellent low stress properties when compared to the comparative compositions.

TABLE 5

| Additive | Sample No. | | | | | | | | | | | |
|---|---|---|---|---|---|---|---|---|---|---|---|---|
| | Invention | | | | | | Comparison | | | | | |
| | 11 | 12 | 13 | 14 | 15 | 16 | $C_5$ | $C_6$ | $C_7$ | $C_8$ | $C_9$ | $C_{10}$ |
| Purified Lanolin | 2 | 2 | 2 | — | — | — | 2 | — | — | — | — | — |
| Calcium Lanolate | — | — | — | 2 | 2 | 2 | — | 2 | — | — | — | — |
| Polydimethylsiloxane | 1 | — | — | 1 | — | — | — | — | 1 | — | — | — |
| Polymethylnonanesiloxane | — | 1 | — | — | 1 | — | — | — | — | 1 | — | — |
| Polymethylphenylsiloxane | — | — | 1 | — | — | 1 | — | — | — | — | 1 | — |

TABLE 6

| | Sample No. | | | | | | | | | | | |
|---|---|---|---|---|---|---|---|---|---|---|---|---|
| | Invention | | | | | | Comparison | | | | | |
| | 11 | 12 | 13 | 14 | 15 | 16 | $C_5$ | $C_6$ | $C_7$ | $C_8$ | $C_9$ | $C_{10}$ |
| Average Life (hr) | 485 | 635 | 570 | 580 | 725 | 650 | 245 | 350 | 120 | 160 | 145 | 90 |

TABLE 7

| Epoxy Resin | Sample No. | | | | | | | | | |
|---|---|---|---|---|---|---|---|---|---|---|
| | Invention | | | | | Comparison | | | | |
| | 17 | 18 | 19 | 20 | 21 | $C_{11}$ | $C_{12}$ | $C_{13}$ | $C_{14}$ | |
| Orthocresol Novolak Epoxy Resin | — | — | — | — | 50 | 100 | 100 | 100 | — | |
| Rubber-Modified Epoxy Resin | 100 | 100 | 100 | 100 | 50 | — | — | — | 100 | |
| Additive | | | | | | | | | | |
| Purified Lanolin | 1 | 2 | — | — | — | 1 | — | — | — | |
| Calcium Lanolate | — | — | 1 | 2 | 1 | — | — | — | — | |

TABLE 8

| | Sample No. | | | | | | | | |
|---|---|---|---|---|---|---|---|---|---|
| | Invention | | | | | Comparison | | | |
| | 17 | 18 | 19 | 20 | 21 | $C_{11}$ | $C_{12}$ | $C_{13}$ | $C_{14}$ |
| Average Life (hr) | 280 | 230 | 320 | 400 | 320 | 200 | 300 | 90 | 100 |

TABLE 9

| | Sample No. | | | | | | | | |
|---|---|---|---|---|---|---|---|---|---|
| | Invention | | | | | Comparison | | | |
| | 17 | 18 | 19 | 20 | 21 | $C_{11}$ | $C_{12}$ | $C_{13}$ | $C_{14}$ |
| No. of Failures Generated | 0 | 0 | 0 | 0 | 1 | 5 | 4 | 10 | 2 |

EXAMPLE 5

Five additional epoxy resin compositions were prepared in accordance with the invention and are designated Sample Nos. 22–26 in Table 10. These samples were prepared using the same components, amounts and conditions as those described in Example 1, except that 100 parts of the orthocresol novolak epoxy resin was mixed with a lanolin additive as indicated in Table 10 and spindle oil or liquid paraffin as a petroleum lubricating oil in the mixing ratios set forth. All amounts set forth are parts by weight.

For purposes of comparison, five comparative resin compositions designated Sample Nos. $C_{15}$–$C_{19}$ were prepared using the same components, amounts and conditions, except that the lanolin and/or lubricating oil were omitted as indicated in Table 10.

The ten epoxy resin compositions of Table 10 were used to encapsulate an electrical element and subjected to the pressure cooker test as described in Example 1. The results of the tests of the moisture resistance of these compositions is set forth in Table 11. As shown from the results, when the epoxy resin compositions in accordance with the invention are tested at high temperature and high humidity, the average life of the electrical component improved markedly compared to componens encapsulated with the comparative compositions.

TABLE 10

| Additive | Sample No. | | | | | | | | | |
|---|---|---|---|---|---|---|---|---|---|---|
| | Invention | | | | | Comparison | | | | |
| | 22 | 23 | 24 | 25 | 26 | $C_{15}$ | $C_{16}$ | $C_{17}$ | $C_{18}$ | $C_{19}$ |
| Lanolin | 2 | 2 | — | — | — | 2 | — | — | — | — |
| Calcium Lanolate | — | — | 2 | 2 | 1 | — | 2 | — | — | — |
| Spindle Oil | 1 | — | 1 | — | — | — | — | 1 | — | — |

TABLE 10-continued

| | Sample No. | | | | | | | | | |
|---|---|---|---|---|---|---|---|---|---|---|
| | Invention | | | | | Comparison | | | | |
| Additive | 22 | 23 | 24 | 25 | 26 | $C_{15}$ | $C_{16}$ | $C_{17}$ | $C_{18}$ | $C_{19}$ |
| Liquid Paraffin | — | 1 | — | 1 | 2 | — | — | — | 1 | — |

TABLE 11

| | Sample No. | | | | | | | | | |
|---|---|---|---|---|---|---|---|---|---|---|
| | Invention | | | | | Comparison | | | | |
| | 22 | 23 | 24 | 25 | 26 | $C_{15}$ | $C_{16}$ | $C_{17}$ | $C_{18}$ | $C_{19}$ |
| Average Life (hr) | 435 | 480 | 555 | 700 | 670 | 245 | 350 | 120 | 155 | 90 |

EXAMPLE 6

Three additional epoxy resin compositions designated Sample Nos. 27–29 in Table 12 were prepared using the same components, amounts and conditions as described in Example 1, except that the orthocresol novolak epoxy resin was used alone or with bisphenol A epoxy resin as indicated in the Table. The epoxy resin was mixed with a lanolin additive and Japan wax at the mixing ratios set forth in Table 12. The amounts set forth are parts by weight.

For purposes of comparison, three additional epoxy resin compositions designated Sample Nos. $C_{20}$–$C_{22}$ were prepared using the same components, amounts and conditions as Sample Nos. 27 and 28, except that the lanolin and/or Japan wax was omitted.

The six epoxy resin composition identified in Table 12 were used to encapsulate an electrical element and subjected to the pressure cooker test as described in Example 1. The results of the moisture resistance test are set forth in Table 13. As shown in the results, when the epoxy resin composition in accordance with the invention are used at high temperatures and high humidity, the average life of the encapsulated electrical component is extended markedly compared to conventional compositions which do not include the additives in accordance with the invention.

TABLE 12

| | Sample No. | | | | | |
|---|---|---|---|---|---|---|
| | Invention | | | Comparison | | |
| Epoxy Resin | 27 | 28 | 29 | $C_{20}$ | $C_{21}$ | $C_{22}$ |
| Orthocresol Novolak Epoxy Resin | 100 | 100 | 75 | 100 | 100 | 100 |
| Bisphenol A Epoxy Resin | — | — | 25 | — | — | — |
| Additive | | | | | | |
| Purified Lanolin | 1 | — | 1 | 1 | — | — |
| Calcium Lanolate | — | 1 | — | — | — | — |
| Japan Wax | 2 | 2 | 2 | — | 2 | — |

TABLE 13

| | Sample No. | | | | | |
|---|---|---|---|---|---|---|
| | Invention | | | Comparison | | |
| | 27 | 28 | 19 | $C_{20}$ | $C_{21}$ | $C_{22}$ |
| Average Life (hr) | 325 | 370 | 295 | 200 | 135 | 90 |

EXAMPLE 7

Three epoxy resin compositions in accordance with the invention designated Sample Nos. 30–32 in Table 14 were prepared. The compositions were prepared using the same components, amounts and conditions as described in Example 1, except that 100 parts by weight of the orthocresol novolak epoxy resin was mixed with a lanolin additive together with aluminum stearate or aluminum oxide stearate trimer as an organoaluminum compound at the mixing ratio set forth in Table 14. The amounts set forth are all parts by weight.

For purposes of comparison, three comparative epoxy resin compositions designated Sample Nos. $C_{23}$–$C_{25}$ in Table 14 were prepared. These comparative compositions were prepared using the same components, amounts and conditions as above, except that calcium lanolate alone or aluminum stearate alone was used as the additive or no additive in accordance with the invention was included.

The six epoxy resin composition identified in Table 14 were used to encapsulate an electrical component which were subjected to the pressure cooker test as described in Example 1. The results of the moisture resistance of the compositions are set forth in Table 15. The results show that when the epoxy resin compositions in accordance with the invention are used at high temperatures and high humidity, the average life of the electrical elements is extended markedly compared to conventional compositions omitting the additives in accordance with the invention.

EXAMPLE 8

Four additional epoxy resin compositions in accordance with the invention designated Sample Nos. 33–36 in Table 16 were prepared. These compositions were prepared using the same components, amounts and conditions as those described in Example 1, except that 100 parts by weight of the orthocresol novolak epoxy resin and a lanolin additive are mixed with isopropyl tristearyl titanate, polybutyl titanate (tetramer) or tetraoctyl bis(ditridecylphosphite) titanate as an organotitanium compound at the mixing ratios set forth in Table 16. The amounts set forth are in parts by weight.

For purposes of comparison, three epoxy resin compositions designated Sample Nos. $C_{26}$–$C_{28}$ in Table 16 were prepared. These comparative compositions were prepared using the same components, amounts and conditions as set forth above, except that calcium lanolate alone or polybutyltitanate (tetramer) alone was used as the additive or no additive in accordance with the invention was included.

These seven epoxy resin compositions were used to encapsulate an electrical element which was subjected to the pressure cooker test described in Example 1. The results of the moisture resistance tests are set forth in Table 17. These results show that when epoxy resin compositions in accordance with the invention are used at high temperatures and high humidity, the average life of the electrical element is increased markedly compared to conventional compositions omitting additives in accordance with the invention.

TABLE 14

| | Sample No. | | | | | |
|---|---|---|---|---|---|---|
| | Invention | | | Comparison | | |
| Additive | 30 | 31 | 32 | $C_{23}$ | $C_{34}$ | $C_{25}$ |
| Purified Lanolin | 1 | — | — | — | — | — |
| Calcium Lanolate | — | 1 | 1 | 1 | — | — |
| Aluminum Stearate | 1 | 1 | — | — | 1 | — |
| Aluminum Oxide Stearate Trimer | — | — | 1 | — | — | — |

TABLE 15

| | Sample No. | | | | | |
|---|---|---|---|---|---|---|
| | Invention | | | Comparison | | |
| | 30 | 31 | 32 | $C_{23}$ | $C_{24}$ | $C_{25}$ |
| Average Life (hr) | 320 | 420 | 575 | 300 | 90 | 90 |

TABLE 16

| | Sample No. | | | | | | |
|---|---|---|---|---|---|---|---|
| | Invention | | | | Comparison | | |
| Additive | 33 | 34 | 35 | 36 | $C_{26}$ | $C_{27}$ | $C_{28}$ |
| Purified Lanolin | 1 | — | — | — | — | — | — |
| Calcium Lanolate | — | 1 | 1 | 1 | 1 | — | — |
| Isopropyl Tristearyl Titanate | 1 | 1 | — | — | — | — | — |
| Polybutyl Titanate (Tetramer) | — | — | 1 | — | — | 1 | — |
| Tetraoctyl Bis(didodecylphosphite) | — | — | — | 1 | — | — | — |

TABLE 17

| | Sample No. | | | | | | |
|---|---|---|---|---|---|---|---|
| | Invention | | | | Comparision | | |
| | 33 | 34 | 35 | 36 | $C_{36}$ | $C_{27}$ | $C_{28}$ |
| Average Life (hr) | 330 | 550 | 475 | 550 | 300 | 95 | 90 |

EXAMPLE 9

Four additional epoxy resin compositions in accordance with the invention designated Sample Nos. 37–40 in Table 18 were prepared. These compositions were prepared using the same components, amounts and conditions as described in Example 1, except that 100 parts by weight of the orthocresol novolak epoxy resin and lanolin additive were mixed with tetrabutyltin, dibutyltin maleate mercapto polymer or dioctyltin distearate as an organotin compound at the mixing ratio set forth in Table 18. The numerals set forth therein are all in parts by weight.

For purposes of comparison, three comparative epoxy resin compositions designated Sample Nos. $C_{29}$–$C_{31}$ in Table 18 were prepared. The comparative compositions were prepared using the same components, amounts and conditions as set forth above, except that the calcium lanolate alone or tetrabutyltin alone was used as the additive or no additive was used.

The seven epoxy resin compositions in Table 19 were used to encapsulate an electrical element which was subjected to the pressure cooker test as described in Example 1. The results of the moisture resistance tests are set forth in Table 19. As is clear from these results, when the epoxy resin compositions in accordance with the invention are used at high temperatures and high humidity, the average life of the encapsulated electrical element is improved markedly compared with the conventional compositions which do not include the additives in accordance with the invention.

TABLE 18

| | Sample No. | | | | | | |
|---|---|---|---|---|---|---|---|
| | Invention | | | | Comparison | | |
| Additive | 37 | 38 | 39 | 40 | $C_{29}$ | $C_{30}$ | $C_{31}$ |
| Purified Lanolin | 1 | — | — | — | — | — | — |
| Calcium Lanolate | — | 1 | 1 | 1 | 1 | — | — |
| Tetrabutyltin | 1 | 1 | — | — | — | 1 | — |
| Dibutyltin Maleate Mercapto Polymer | — | — | 1 | — | — | — | — |
| Dicotyltin Distearate | — | — | — | 1 | — | — | — |

TABLE 19

| | Sample No. | | | | | | |
|---|---|---|---|---|---|---|---|
| | Invention | | | | Comparison | | |
| | 37 | 38 | 39 | 40 | $C_{29}$ | $C_{30}$ | $C_{31}$ |
| Average Life (hr) | 370 | 550 | 530 | 630 | 300 | 110 | 90 |

It will thus be seen that the objects set forth above, among those made apparent from the preceding description, are efficiently attained and, since certain changes may be made in the above composition of matter without departing from the spirit and scope of the invention, it is intended that all matter contained in the above description shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

Particularly it is to be understood that in said claims, ingredients or compounds recited in the singular are intended to include compatible mixtures of such ingredients wherever the sense permits.

What is claimed is:

1. An epoxy resin composition having improved moisture resistance and rust preventing properties, comprising an epoxy resin, a hardener and at least one additive selected from the group consisting of lanolin, lanolin fatty acids and lanolin fatty acid metal salts, the additive present in an amount sufficient so that a portion of said additive does not react with the epoxy resin and exudes to the surface of the epoxy resin composition when the composition is used.

2. The epoxy resin composition of claim 1, wherein said lanolin fatty acid metal salts are at least one lanolate selected from the group consisting of barium lanolate, magnesium lanolate, zinc lanolate, aluminum lanolate, calcium lanolate and sodium lanolate.

3. The epoxy resin composition of claim 1, wherein said additive is one of purified lanolin and calcium lanolate.

4. The epoxy resin composition of claim 3, further including a secondary additive comprising methylphenylpolysilsesquioxane.

5. The epoxy resin composition of claim 3, further including polymethylnonanesiloxane.

6. The epoxy resin composition of claim 3, further including an acrylonitrilebutadiene copolymer having carboxyl groups at both terminals of the polymer chain.

7. The epoxy resin composition of claim 3, further including a secondary additive comprising spindle oil.

8. The epoxy resin composition of claim 3, further including liquid paraffin.

9. The epoxy resin composition of claim 3, further including Japan wax.

10. The epoxy resin composition of claim 3, further including aluminum stearate.

11. The epoxy resin composition of claim 3, further including tetraoctyl bis(didodecylphosphite) titanate.

12. The epoxy resin composition of claim 3, further including a secondary additive comprising dioctyltin distearate.

13. The epoxy resin composition of claim 1, wherein said additive is included in an amount of about 0.1–10 parts by weight per 100 parts by weight of the epoxy resin.

14. The epoxy resin composition of claim 1, wherein said epoxy resin is at least one of a glycidyl ether epoxy resin, a phenol novolak epoxy resin, a cresol novolak epoxy resin, an alicyclic epoxy resin, a glycidyl ester epoxy resin, a linear aliphatic epoxy resin and a halogenated epoxy resin.

15. The epoxy resin composition of claim 1, wherein said hardener is at least one selected from acid anhydrides, aromatic amines, aliphatic amines, alicyclic amines and prepolymers of synthetic resins.

16. The epoxy resin composition of claim 1, wherein said hardener is present in an amount so that the chemical equivalent ratio of the number of functional groups in the hardner to the number of epoxy groups in the epoxy resin is in the range of about 0.5–1.5.

17. The epoxy resin composition of claim 1, wherein said additive further includes at least one secondary additive selected from the group consisting of organosilicon compounds, organoaluminum compounds, organotitanium compounds, organotin compounds, liquid rubbers having a structure with functional groups at both ends of the molecule, petroleum lubricating oils and Japan wax.

18. The epoxy resin composition of claim 17, wherein said lanolin fatty acid metal salts are at least one lanolate selected from the group consisting of barium lanolate, magnesium lanolate, zinc lanolate, aluminum lanolate, calcium lanolate and sodium lanolate.

19. The epoxy resin composition of claim 17, wherein said additive includes one of purified lanolin and calcium lanolate.

20. The epoxy resin composition of claim 17, wherein said additive is included in an amount of about 0.1–10 parts by weight per 100 parts by weight of the epoxy resin.

21. The epoxy resin composition of claim 17, wherein said secondary additive is an organosilicon compound.

22. The epoxy resin composition of claim 21, wherein said organosilicon compound is at least one of an alkylarylsilsesquioxane silicone compound and an organosiloxane polymer.

23. The epoxy resin composition of claim 22, wherein said alkylarylsilsesquioxane silicone compound is at least one member selected from compounds of the following chemical formula:

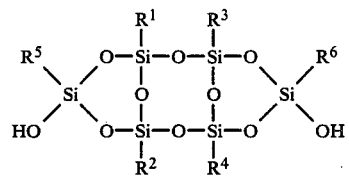

wherein $R^1$–$R^6$ are the same or different and each represents at least one of alkyl, aryl, alkenyl and aralkyl.

24. The epoxy resin composition of claim 23, wherein said alkylarylsilsesquioxane silicone compound is methylphenylpolysilsesquioxane.

25. The epoxy resin composition of claim 22, wherein said organosilicon compound is at least one organosiloxane polymer selected from compounds of the following chemical formula:

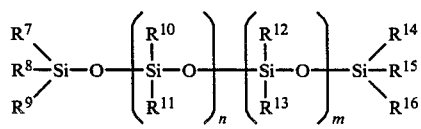

wherein $R^7$–$R^{16}$ are the same or different and each represents at least one of alkyl, aryl, alkenyl, aralkyl, hydrogen and hydroxy, and n and m are independently 0 or an integer of 1 or more.

26. The epoxy resin composition of claim 25, wherein said organosiloxane polymer is at least one of polydimethylsiloxane, polymethylphenylsiloxane, polydiphenylsiloxane, polymethylhydrogensiloxane, polymethylpentylsiloxane and polymethylnonanesiloxane.

27. The epoxy resin composition of claim 21, wherein said organosilicon compound is included in an amount of about 0.1–5 parts by weight per 100 parts by weight of the epoxy resin.

28. The epoxy resin composition of claim 17, wherein said secondary additive is an organoaluminum compound.

29. The epoxy resin composition of claim 28, wherein said organoaluminum compound is at least one of a trialkoxyaluminum compound, an aluminum chelate compound and aluminum coupling agent.

30. The epoxy resin composition of claim 29, wherein said organoaluminum compound is selected from the group consisting of aluminum isopropylate, aluminum butylate, aluminum sec-butylate, aluminum tert-butylate, aluminum diisopropylate sec-butylate, aluminum isopropylate di-sec-butylate, aluminum octylate, aluminum laurate, aluminum stearate, aluminum oxide isopropylate, aluminum oxide octylate, aluminum oxide stearate, aluminum tris-ethylacetoacetate, aluminum isopropoxyethylacetoacetate, aluminum dibutoxyacetoacetate and aluminum dibutoxyethylacetate.

31. The epoxy resin composition of claim 28, wherein said organoaluminum compound is included in an amount of about 0.01–5 parts by weight per 100 parts by weight of the epoxy resin.

32. The epoxy resin composition of claim 17, wherein said secondary additive is an organotitanium compound.

33. The epoxy resin composition of claim 32, wherein said organotitanium compound is at least one of a tetraalkoxytitanium compound, a titanium acylate compound, a titanium chelate compound and a titanium coupling agent.

34. The epoxy resin composition of claim 33, wherein said organotitanium compound is at least one of tetraisopropyl titanate, tetrabutyl titntatet, tetra-2-ethylhexyl titanate, tetrastearyl titanate, isopropyl tristearyl titanate, tributyl stearyl titanate, butyl titanate dimer, polytripropyl titanate, polybutyl titanate, polytributyl stearyl titanate, titanium acetylacetonate, titanium ethylacetoacetate, titanium octylate glycolate, dihydroxy-bis(lactate) titantium, tetraoctylene glycol titanium, dipropoxytitanium bis(lactate), polytitanium acetylacetonate, polyhydroxytitanium stearate, isopropyl tridodecylbenzenesulfonyl titanate, isopropyl tris(dioctylpyrophosphate) titanate, tetraisopropyl bis(dioctylphosphite) titanate, tetraoctyl bis(ditridecylphosphite) titanate, tetra(2,2-diallyloxymethyl-1-butyl)bis(ditridecyl)phosphite titanate, bis(dioctylpyrophosphate) oxyacetotitanate and bis(dioctylpyrophosphate)ethylene titanate.

35. The epoxy resin composition of claim 32, wherein said organotitanium compound is present in an amount of about 0.01–5 parts by weight per 100 parts by weight of the epoxy resin.

36. The epoxy resin composition of claim 17, wherein said secondary additive is an organotin compound.

37. The epoxy resin composition of claim 36, wherein said organotin compound is an organotin stabilizer compatible with polyvinyl chloride.

38. The epoxy resin composition of claim 37, wherein said organotin stabilizer is at least one of tetrabutyltin, dibutyltin dilauryl mercaptide, butyltin trisdodecyl mercaptide, dimethyltin sulfide, monooctyltin sulfide, tributyltin laurate, tributyltin oleate, dibutyltin dilaurate, dibutyltin distearate, dibutyltin laurate maleate, dioctyltin laurate maleate, tributyltin acetate, trimethyltin maleate, tributyltin maleate, tributyl gluconate, dibutyltin oxide, bistributyltin oxide, tetraphenyltin, tributyltin butyl phenolate, tributyltin benzoate, triphenyltin benzoate, triphenyltin terephthalate and tributyltin cinnamate.

39. The epoxy resin composition of claim 36, wherein said organotin compound is included in an amount of about 0.01–5 parts by weight per 100 parts by weight of the epoxy resin.

40. The epoxy resin composition of claim 17, wherein said secondary additive is a liquid rubber having functional groups at both ends of the molecules.

41. The epoxy resin composition of claim 40, wherein said functional groups are at least one of carboxyl, epoxy, amino and hydroxyl groups.

42. The epoxy resin composition of claim 40, wherein said liquid rubber is selected from polybutadiene, an acrylonitrile-butadiene copolymer, a styrene-butadiene copolymer and a polysulfide.

43. The epoxy resin composition of claim 40, wherein said liquid rubber is an acrylonitrile-butadiene copolymer having carboxyl groups at both ends of the polymer molecules.

44. The epoxy resin composition of claim 40, wherein said liquid rubber is included in an amount of about 0.5–20 parts by weight per 100 parts by weight of the epoxy resin.

45. The epoxy resin composition of claim 17, wherein said secondary additive is a petroleum lubricating oil.

46. The epoxy resin composition of claim 45, wherein said petroleum lubricating oil is selected from spindle oil, refrigerating machine oil, engine oil, cylinder oil, gear oil, aircraft lubricating oil and liquid paraffin.

47. The epoxy resin composition of claim 45, wherein said petroleum lubricating oil is included in an amount of about 0.1–10 parts by weight per 100 parts of the epoxy resin.

48. The epoxy resin composition of claim 17, wherein said member is Japan wax.

49. The epoxy resin composition of claim 48, wherein said Japan wax is included in an amount of about 0.1–10 parts by weight per 100 parts by weight of the epoxy resin.

50. The epoxy resin composition of claim 17, wherein said epoxy resin is at least one selected from a glycidyl ether epoxy resin, a phenol novolak epoxy resin, a cresol novolak epoxy resin, an alicyclic epoxy resin, a glycidyl ester epoxy resin, a linear aliphatic epoxy resin and a halogenated epoxy resin.

51. The epoxy resin composition of claim 17, wherein said hardener is at least one selected from acid anhydrides, aromatic amines, aliphatic amines, alicyclic amines and prepolymers of synthetic resins.

52. The epoxy resin composition of claim 17, wherein said hardener is present in an amount so that the chemical equivalent ratio of the number of functional groups in the hardner to the number of epoxy groups in the epoxy resin is in the range of about 0.5–1.5.

53. An epoxy resin composition having improved moisture resistance and rust preventing properties, comprising an epoxy resin, a hardener, at least one additive selected from the group consisting of lanolin, lanolin fatty acids and lanolin fatty acid metal salts, and at least one secondary additive selected from the group consisting of organosilicon compounds, organoaluminum compounds, organotitanium compounds, organotin compounds, liquid rubbers having a structure with functional groups at both ends of the molecule, petroleum lubricating oils and Japan wax, the additive present in an amount sufficient so that a portion of said additive does not react with the epoxy resin and hardener and exudes to the surface of the epoxy resin composition when the composition is used to encapsulate an electrical component, the additive and secondary additive being present in an amount sufficient to increase the moisture resistance and rust prevention properties of the composition.

* * * * *